US011005662B2

(12) United States Patent
Duncan et al.

(10) Patent No.: US 11,005,662 B2
(45) Date of Patent: May 11, 2021

(54) MULTIMODAL COMMUNICATION SYSTEM (71) Applicant: UT-Battelle, LLC, Oak Ridge, TN (US)

(72) Inventors: Andrew M. Duncan, Oak Ridge, TN (US); Andrew Harter, Oak Ridge, TN (US); Charles K. Roberts, II, Oak Ridge, TN (US); Brad J. Stinson, Oak Ridge, TN (US); Thad Thompson, Oak Ridge, TN (US); Bogdan Vacaliuc, Oak Ridge, TN (US)

(73) Assignee: UT-BATTELLE, LLC, Oak Ridge, TN (US)

( * ) Notice: Subject to any disclaimer, the term of this patent is extended or adjusted under 35 U.S.C. 154(b) by 340 days.

(21) Appl. No.: 16/145,435

(22) Filed: Sep. 28, 2018

(65) Prior Publication Data
US 2020/0067712 A1 Feb. 27, 2020

Related U.S. Application Data (60) Provisional application No. 62/720,325, filed on Aug. 21, 2018.

(51) Int. Cl.
H04L 9/32 (2006.01)
G05D 1/00 (2006.01)
H04W 12/06 (2021.01)

(52) U.S. Cl.
CPC ......... *H04L 9/3236* (2013.01); *G05D 1/0022* (2013.01); *H04W 12/06* (2013.01)

(58) Field of Classification Search
CPC .... H04L 9/3236; G05D 1/0022; H04W 12/06
See application file for complete search history.

(56) References Cited

U.S. PATENT DOCUMENTS

| 7,111,023 | B2* | 9/2006 | Norcott ................... | G06F 17/30 |
| | | | | 707/203 |
| 7,624,943 | B2* | 12/2009 | Cerchie et al. ......... | B64C 27/00 |
| | | | | 244/17.11 |
| 9,649,999 | B1* | 5/2017 | Amireddy et al. ...... | G05D 1/00 |
| 10,038,979 | B1* | 7/2018 | Jiang et al. ............. | H04L 27/00 |

(Continued)

OTHER PUBLICATIONS

International Search Report and Written Opinion in International Patent Application No. PCT/US19/46755, dated Dec. 27, 2019 (12 pages).

*Primary Examiner* — Adam R Mott
*Assistant Examiner* — Frank T Glenn, III
(74) *Attorney, Agent, or Firm* — Lempia Summerfield Katz LLC (57) ABSTRACT A multimodal communication system includes a vehicle controller that controls one or more systems or subsystems of an unmanned vehicle. The communication controller manages communication and logical access to the unmanned vehicle. One or more sensors in communication with the communication controller detects and measures physical properties in proximity to the unmanned vehicle. Transceivers receive the unmanned vehicle commands that are transmitted simultaneously or concurrently and a monotonic generator generates a monotonic object each time the unmanned vehicle's operating state changes. The communication controller executes the first unmanned vehicle command received that has the correct cryptographic hash validating knowledge of the unmanned vehicle's current operating state.

20 Claims, 6 Drawing Sheets (56) References Cited

U.S. PATENT DOCUMENTS

| | | | |
|---|---|---|---|
| 10,505,802 B2* | 12/2019 | Prieto et al. | H04L 12/24 |
| 2011/0066853 A1* | 3/2011 | Engels et al. | H04L 9/32 |
| | | | 713/168 |
| 2017/0061290 A1 | 3/2017 | Harlow et al. | |
| 2017/0300054 A1 | 10/2017 | Hanson et al. | |
| 2018/0086451 A1 | 3/2018 | Vaughn et al. | |
| 2018/0089435 A1 | 3/2018 | Zander et al. | |
| 2019/0113332 A1 | 4/2019 | Nishimura et al. | |
| 2019/0187291 A1* | 6/2019 | Troia | G01S 17/93 |

* cited by examiner

FIGURE 6

MULTIMODAL COMMUNICATION SYSTEM

PRIORITY CLAIM

This application claims the benefit of priority from U.S. Provisional Application No. 62/720,325, filed Aug. 21, 2018, which is incorporated by reference.

STATEMENT REGARDING FEDERALLY SPONSORED RESEARCH AND DEVELOPMENT

The inventions were made with United States government support under Contract No. DE-AC05-00OR22725 awarded by the United States Department of Energy. The United States government has certain rights in the inventions.

BACKGROUND

Technical Field

This disclosure relates to unmanned vehicles and more specifically to communication protocols that control unmanned vehicles.

Related Art

Both the military and civilians use unmanned autonomous vehicles to provide damage assessments, topographical assessments, harvest assessments, reconnaissance, utility inspections, chemical and biological monitoring, exploration, etc. Many vehicles use only dedicated line-of-sight communication making it difficult to communicate beyond line-of-sight guidance. Users cannot coordinate one or groups of vehicles from remote locations.

DETAILED DESCRIPTION

A multimodal communication system provides a reliable and robust command and control for unmanned vehicles (UVs). Using a secure data packet, the systems provide redundant and reliable communication. The system enables unmanned vehicles to operate simultaneously (e.g., swarming) in remote locations and allow distributed groups of diverse UVs to work together beyond line of sight guidance. The systems provide dynamic formation control and dynamic real-time communication reconfigurations in formats compatible with proprietary and open source platforms.

The multimodal autonomous vehicle systems are configurable and adaptable. Using a goal state engine and in-line de-duplication algorithms (e.g., synchronized to process commands as they are received) within the communication controller, the multimodal communication system enables UVs to advance from one operating state to another without conflict. The communication controller commands comprise a mutation of data representing a current operating state of a targeted UV. In some applications, a hash coding encodes a descriptor object or an identifier object that uniquely identifies the UV's current operating state in the UV command. The hash coding allows the UV to verify the integrity of the UV command, which prevents intruders from substituting false UV commands for legitimate UV commands.

The multimodal communication system starts a UV at an operating state and through a de-duplicated and validated first received controller command moves the UV toward a goal state. Goal states are the desirable results of the system. They are coded as decision tree functions within the memory of each communication controller. The goal states associate the communication controller to one or more operating states or maneuvers.

Figure 1:
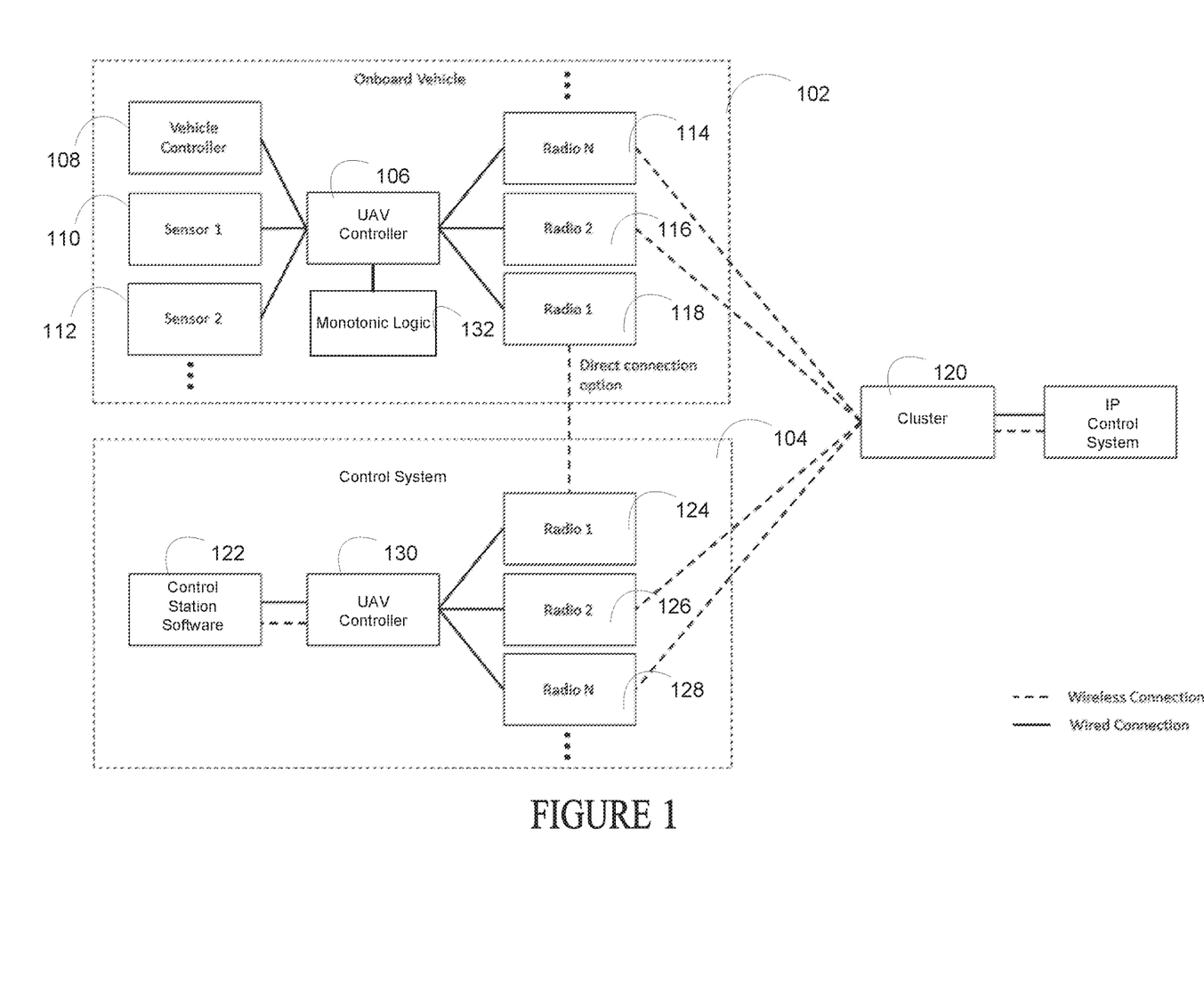
FIG. 1 is a block diagram of a multimodal communication system.

FIG. 1 shows a multimodal communication system. The multimodal communication system communicates with a UV 102 (partially shown as the onboard vehicle). The block diagrams represent portions of the software and hardware that comprise the UV 102, an optional remote ground-based system 104, and a wireless Internet Protocol network. Onboard the UV 102, a multimodal communication controller (referred to as the communication controller 106) bridges the flight controller 108 and the one or more sensors (video and other sensors, 110, 112, etc.) to the transceivers 114-118, etc. (identified as 114-118). The flight controller 108 controls one or more of the electrical systems or subsystems of the UV 102. The sensors 110-112 detect or measure a physical property at or near the UV 102 by converting nonelectrical energy into electrical energy (e.g., data). The communication controller 106 manages communication and logical access to the UV 102 and manages the UV's 102 operation. The communication controller 106 passes multi-sensor output and control data over multiple communication channels interfaced by transceivers 114-118, etc., in some embodiments, simultaneously. An optional communication link facilitates a direct connection between a UV 102 and the optional remote ground-based system 104. The optional remote ground-based system 104 may provide supplementary point-to-point control of the UV 102 to compensate for communication channel/link failures and bandwidth restrictions.

When data is received at cluster 120, the data is aggregated and distributed to one or more on-line and/or isolated turnkey control systems directly or through subscriptions. In FIG. 1, the optional remote ground-based system 104 includes hardware and software 122 for controlling the UV 102 and transceivers 124-128, etc., (identified as 124-128) interfacing to the cluster 120 or the UV 102 directly. When an optional remote ground-based system 104 is in use, one or more transceivers 124-128 route data to the ground control station 122 through a second communication controller 130. Operational or supplementary control occurs through the ground control station software 122. The use of the remote ground-based system 104 provides redundancy and flexibility to the multimodal communication system. The remote ground-based system 104 may access the Internet via the second communication controller 130 and one or more transceiver while receiving UV telemetry and other data directly through one or more separate transceivers.

In FIG. 1, commands are transmitted simultaneously to the UV 102 through a plurality of separate wireless communication links. In normal operations, the UVs process all commands received via the communication links as they are received. The remote ground-based system 104 or cluster 120 (referred to as a control node) also receives a copy of state messages generated by the UVs 102 through those same communication links that deliver the control messages.

The wireless links shown in FIG. 1 transmit UV commands and communications through multiple protocols, including for example, Wi-Fi, cellular, satellite, ultra-wideband, etc. Each UV state message is encoded with a persistent monotonic counter object generated within the UV 102, and each command sent to UV 102 is encoded with a cryptographic hash against which the command is validated. A new monotonic object is transmitted to a control node each time a new state message is generated by the communication controller 106, which occurs at each state change. A state change is a change in a unique configuration of the UV 102 that is indicative of an event (e.g., an action or occurrence detected by software) from within the UV 102. While traditional communication routing selects a communication link based on a link's state or a metric, such as a link's bandwidth capacity, the communication controller 106 receives and transmits all messages concurrently via transceivers 114-118 without monitoring link state. In turn, the communication controller 106 rejects outdated state updates by detecting those without a validated monotonic object. A validated monotonic object is a monotonic object associated with or assigned to the current UV operating state. A state change generates a new state message via the monotonic logic 132, which is transmitted by the communication controller 106 to the control nodes. The timing and delivery of the new state message mitigates latency as control nodes update their state knowledge at a rate bounded by the rate data is received from their lowest latency link.

The monotonic logic 132 includes a monotonic generator that generates unique monotonic objects and includes an increment engine, a check operation engine, and a validation engine. An increment engine atomically increases the value or modifies the monotonic object with each UV 102 state change. A check operation engine suspends the generation or modification of monotonic objects until a UV's 102 state changes. A command validation engine authenticates command objects by calculating a cryptographic hash resulting from a mutation of the incoming command and the current known command sequence object and comparing it with the command sequence object provided as part of the command.

In operation, once a command is applied, the UV 102 discards other commands not associated with a current cryptographic hash object. Once a command is applied, the system terminates the processing of other commands received later in time if that command contains an older cryptographic hash object, thereby de-duplicating commands received across other communication links. The termination ensures that unneeded processing does not degrade UV 102 performance. Further, once terminated, other commands associated with prior cryptographic hash objects are not stored. This practice remediates the UV's 102 memory use, which can be critical for systems operating at or near full capacity.

Goal states are the desirable results of the system. They are coded as decision tree functions within the memory of each communication controller. The goal state, through the use of the decision tree, is responsible for obtaining the high-level state of goals each UV 102 is capable of executing. Each goal state is orthogonal to one another, which means that any set of actions may be changed without affecting the operational stability of the UV 102. In some systems, a goal state comprises two or more successive operations to be executed by the UV 102 to attain the desired goal. In the disclosed protocol, a goal state can be encoded in a single state message along with platform telemetry data and transmitted synchronously or asynchronously to control nodes. The transmission state depends on the granularity of control used.

In the multimodal communication system, the commands transmitted from control nodes are deterministic mutations of the current operating state that enables or modifies a goal state. Because the goal state commands are orthogonal, all valid commands are idempotent and therefore may be executed repeatedly without corrupting the operating state of the UV 102. In addition to being idempotent, each valid command includes a command sequence. The command sequence includes a unique UV 102 identifier such as a unique 32-bit integer, for example, initialized by the multimodal communication system at UV 102 power up. The unique UV 102 identifier is encoded in every state message transmitted by the UV 102. The UV 102 commands and parameters are configured to be deterministically hashed on all control nodes. The semantics of an exemplary command sequence may adhere to:

CommandSequence=Truncate32(MD5(CommandSequence, Command)).

Figure 2:
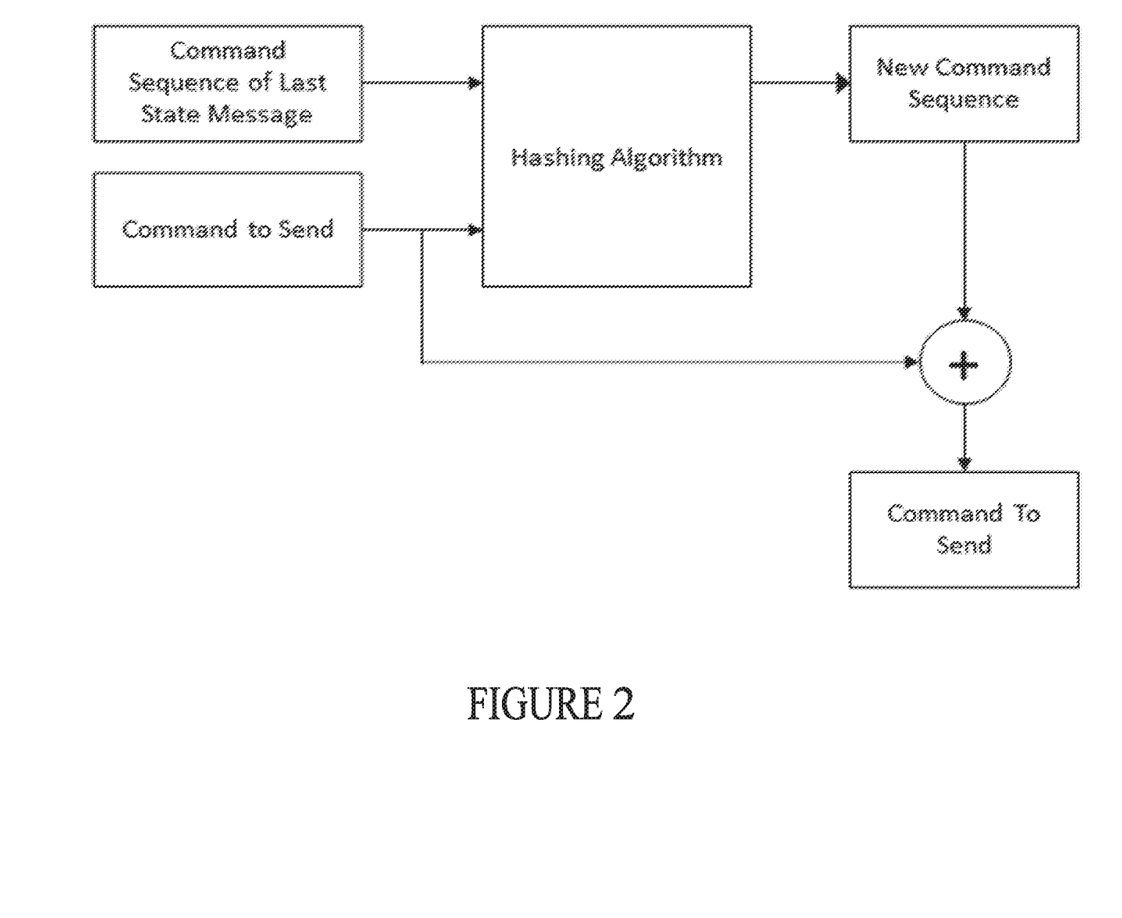
FIG. 2 is a block diagram of a command sequence generating commands.

CommandSequence N+1 is computed by taking the first 32 bits of an MD5 message digest hash of the CommandSequence N and hashing it with an incoming command of the last state message as illustrated in FIG. 2. The new command sequence is combined with a desired command (command N+1) and transmitted to the UV 102 by a control node. When a system begins in an initialized goal state, the CommandSequence is randomized.

Figure 3:
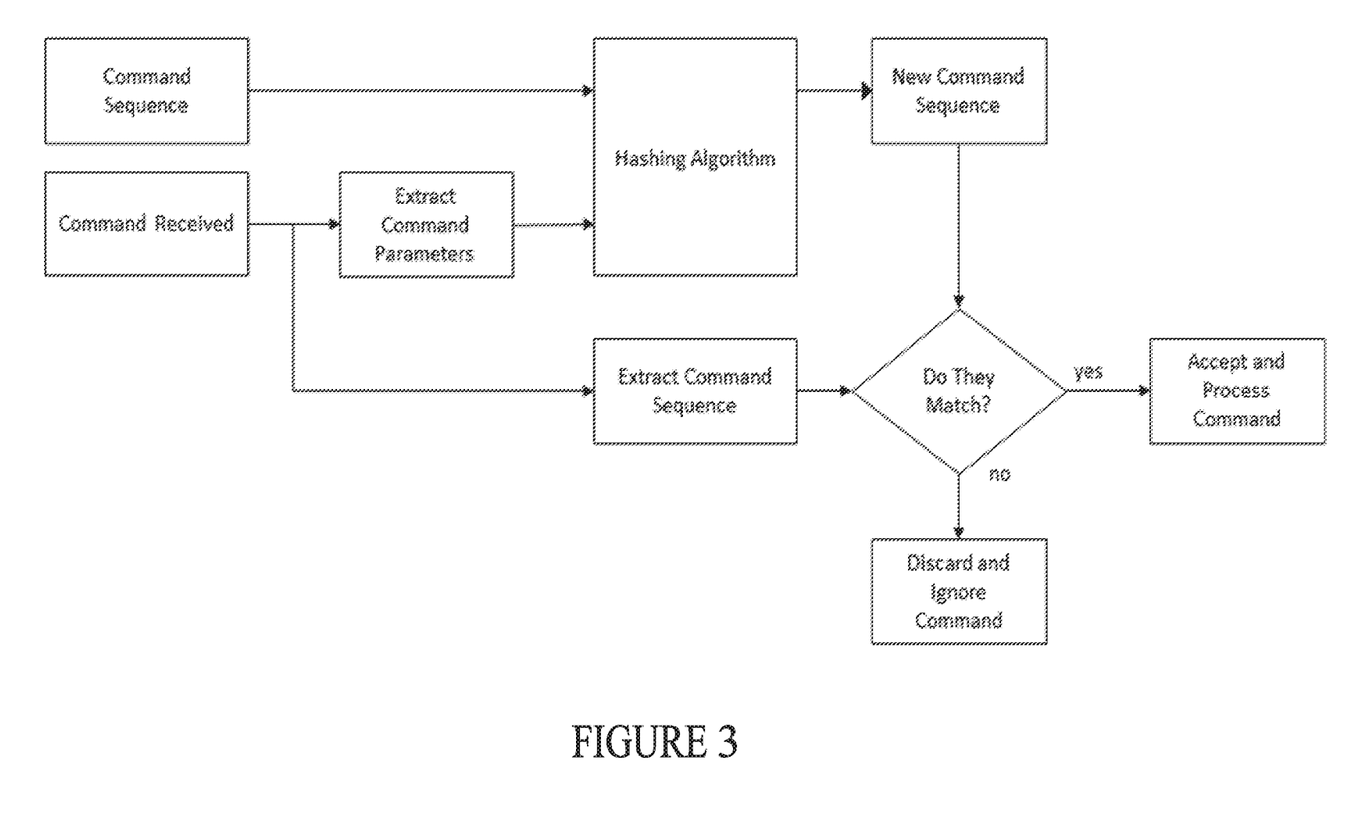
FIG. 3 is a block diagram of an exemplary command sequence validating an unmanned autonomous vehicle command.

When a desired UV 102 receives a command, it extracts command parameters and hashes the command parameters with its command sequence to generate a new command sequence as shown in FIG. 3. The command sequence then compares the new or generated command sequence to the command sequence included in the message. If they match, the command is accepted, executed, and the cryptographic hash engine 134 updates the command sequence object. A new state message is transmitted with the updated command sequence object, and in some instances, with the current goal state of the UV 102. When an entire train of commands is accepted by the UV 102, all other control node commands are locked out to prevent discontinuous control of the UV 102. A mismatch detection in FIG. 2 may indicate that a command was created against a different operating state of the system or that an intruder was attempting an unauthorized control of the UV 102. A mismatch causes the UV 102 to discard the command.

The disclosed processes provide a flexible and nuanced remediation and command deconfliction for all control nodes. When multiple control nodes send commands simultaneously, only the first received command associated with the current cryptographic hash object is accepted; the other commands while at least partially processed are rejected. This scheme is robust in view of the variable latency common to known systems, as it bases command applicability on the state of the system instead of time or origin or medium of delivery of a command. The multimodal communication system or control nodes can track command loss too by identifying and detecting state messages that do not have a current cryptographic hash object. Because commands are idempotent, commands can be retransmitted across different communication links in some systems to ensure continuity of command and control and continuous communication flow.

Authentication is assured in some multimodal communication systems through security tokens. The tokens are generated at cluster 120 and logically programmed or physically embedded within the hardware of the UVs 102 making it a unitary part of the hardware. When a connection is made, the UVs 102 automatically transmit authentication information to cluster 120. The authentication information may include the UV's serial number, a security token, and an encoded concatenation of the messages sent. In response, cluster 120 interprets the token to determine if the UV 102 is provisioned and authorized, and if so, decodes the messages, routing the messages to the appropriate destinations if the UV 102 is registered. If a token is invalid, messages are ignored, and the transmission terminates with a not-authorized response.

UVs 102 register at cluster 120. All UV's are publishers of their state. Some registrations include a code that indicates if the UV is also a subscriber to state messages from other UV's or another registered device. A registration contains an identifier associated with a communication group, the UV's serial number, the UV's call sign, and/or a UV's system identifier. On power up or in response to a request, the UV transmits its registration. When a UV's registration matches the registration persisted at the cluster 120 and the message is authenticated, the registration is confirmed and the UV's published messages are accepted and routed to their intended destinations. If a UV 102 is authenticated but is not recognized, the cluster 120 transmits configuration messages to the UV 102 until the UV 102's registration is recognized. Registration information is retained in non-volatile memory in the UV 102 and cluster 120.

Alternatively, the UV 102 may act as a publisher and a subscriber without using the registration codes previously described. In this scheme, a UV 102 communicates to other UV's through communication links that connect them together directly. UV's authenticate and validate the messages they receive over these links according to the cryptographic information provided to them by cluster 120 and/or stored in non-volatile memory of the UV. So, publishers inject state messages and/or commands into the communication links and subscribers receive state and command messages through the communication links.

The alternative communication method which does not rely on registration is useful for coordinating actions of UV's that require lower latency communications than those which pass through cluster 120. When operating in this mode, the authentication of messages is performed by UV's acting as subscribers using cryptographic information provided to them by cluster 120 and/or stored in the non-volatile memory of the UV.

Publishers and subscribers need not know the systems topology or know which UV 102 or control node is publishing or subscribing to messages. The system further provides scalability beyond that of traditional client-server architectures. The system scales up or down to serve data to many UVs 102, control nodes and servers Internet-wide. De-coupling of command messages and published state eliminates the need for a larger message-oriented middleware scheme and reduces the processing and memory resources required to operate the system and its communication scheme. This paradigm better serves the limited hardware and computational capabilities of the UVs 102, the use of their limited system resources, and in some applications the use of resources available to some control nodes, such as mobile control nodes. In some multimodal communication systems a processor is configured to participate in publish and subscribe behavior by removing a publisher of a system state. In these multimodal communication systems attributes of the publish and subscribe system are inferred by an operating system directory accessible to the communication controller.

Figure 4:
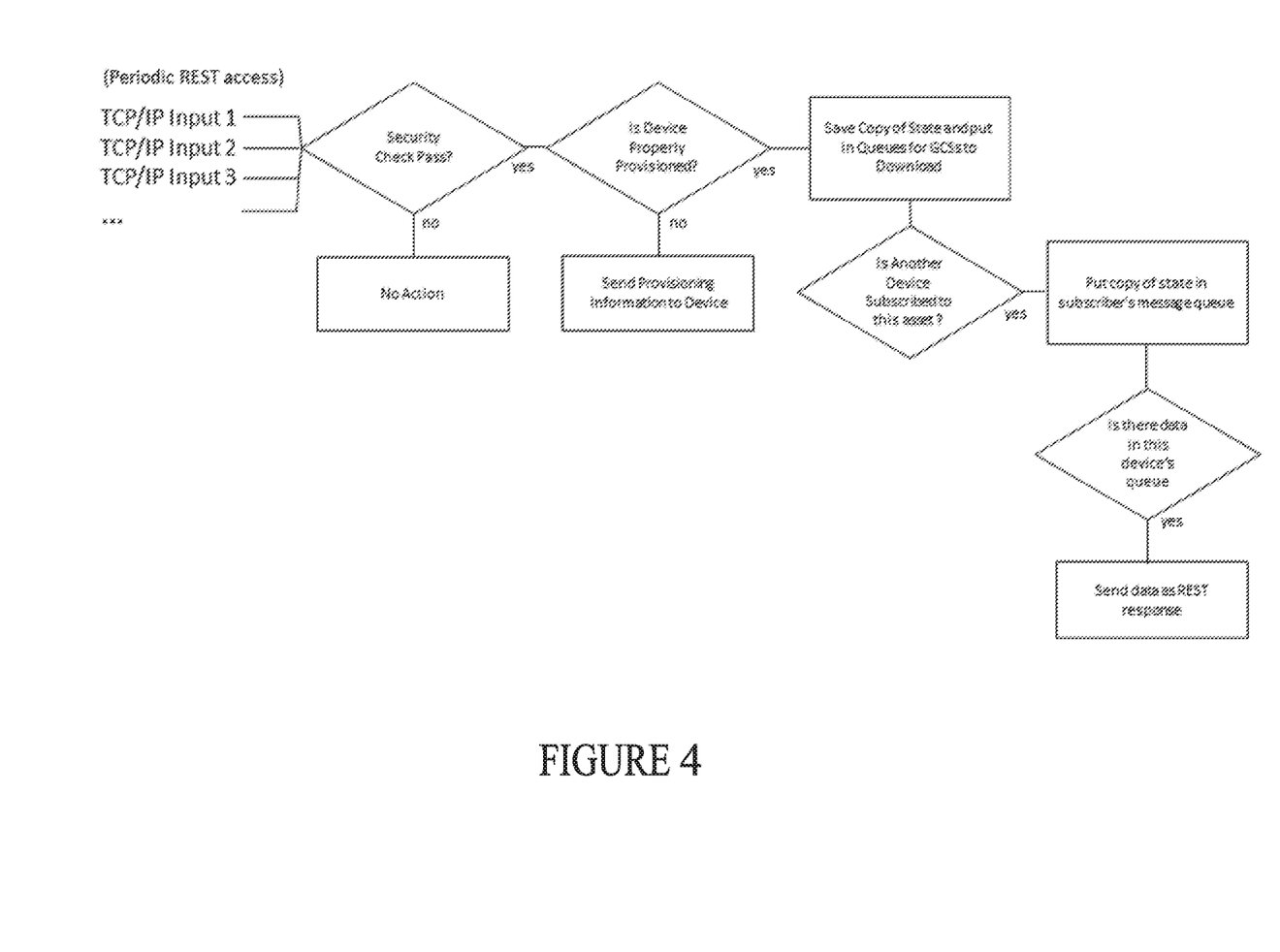
FIG. 4 is an exemplary system communication flow.

FIG. 4 shows a communication flow between a UV 102 and cluster 120. As shown, packets of messages arrive at the cluster 120 through a variety of interfaces, either directly from a UV 102, through IP connections, and in some systems, through an Internet Service Provider (ISP). Every message received from the UV 102 is authenticated. Periodic registration messages are received from UV 102 at the cluster 120 and cluster 120 provides provisioning information if appropriate. Thereafter, the cluster 120 instantiates a message queue, and in some systems, instantiates separate publish and subscribe queues. As shown, the server stores a copy of the UV's 102 its current state message in a publication queue before responding to the RESTful HTTP request.

Figure 5:
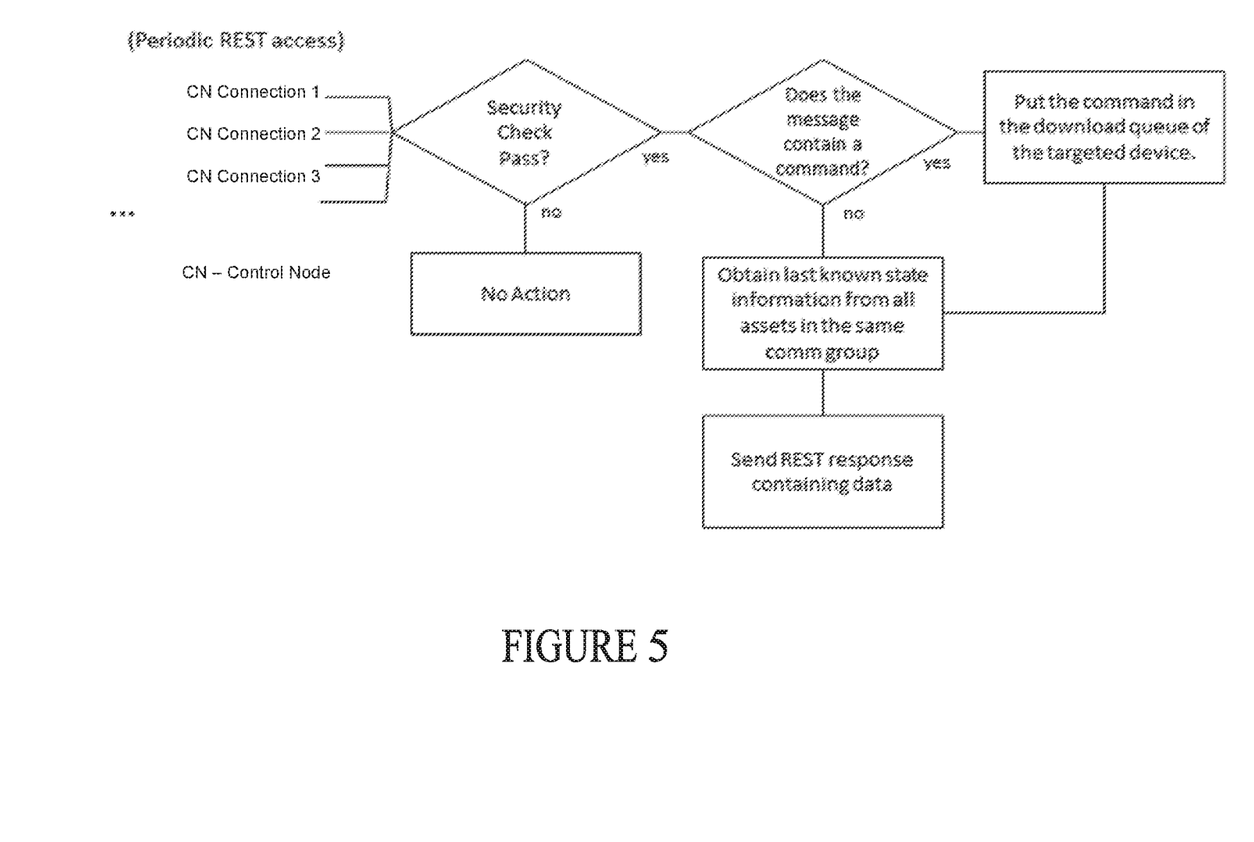
FIG. 5 is an exemplary cluster communication flow.

FIG. 5 shows an exemplary communication flow between a control node and the cluster 120. In FIG. 5, security is enforced through login credentials or one or more security tokens. The incoming packets are aggregated and messages parsed to detect commands. If a command is present, it is stored in a download queue for its targeted UV 102. When the UVs 102 are identified, the clusters 120 gather state information from all of the UVs 102 designated by a user which is transmitted in a RESTful HTTP response.

Because the multimodal communication system architecture includes the ability to route data from multiple vehicles and multiple control nodes simultaneously, some systems apply segmentation. In this alternative system, the architecture associates UVs 102 with an organization and a group, such as a communication (comm) group, for example. Because each user belongs or is assigned to an organization, when a user connects to the cluster 120, their credentials and security tokens provide access to data from the assets within their own organization. Through the use of access privileges, access to resources may be restricted facilitating the provisions within resource-restricted environments (IP address allocations, system id allocations, etc.).

Figure 6:
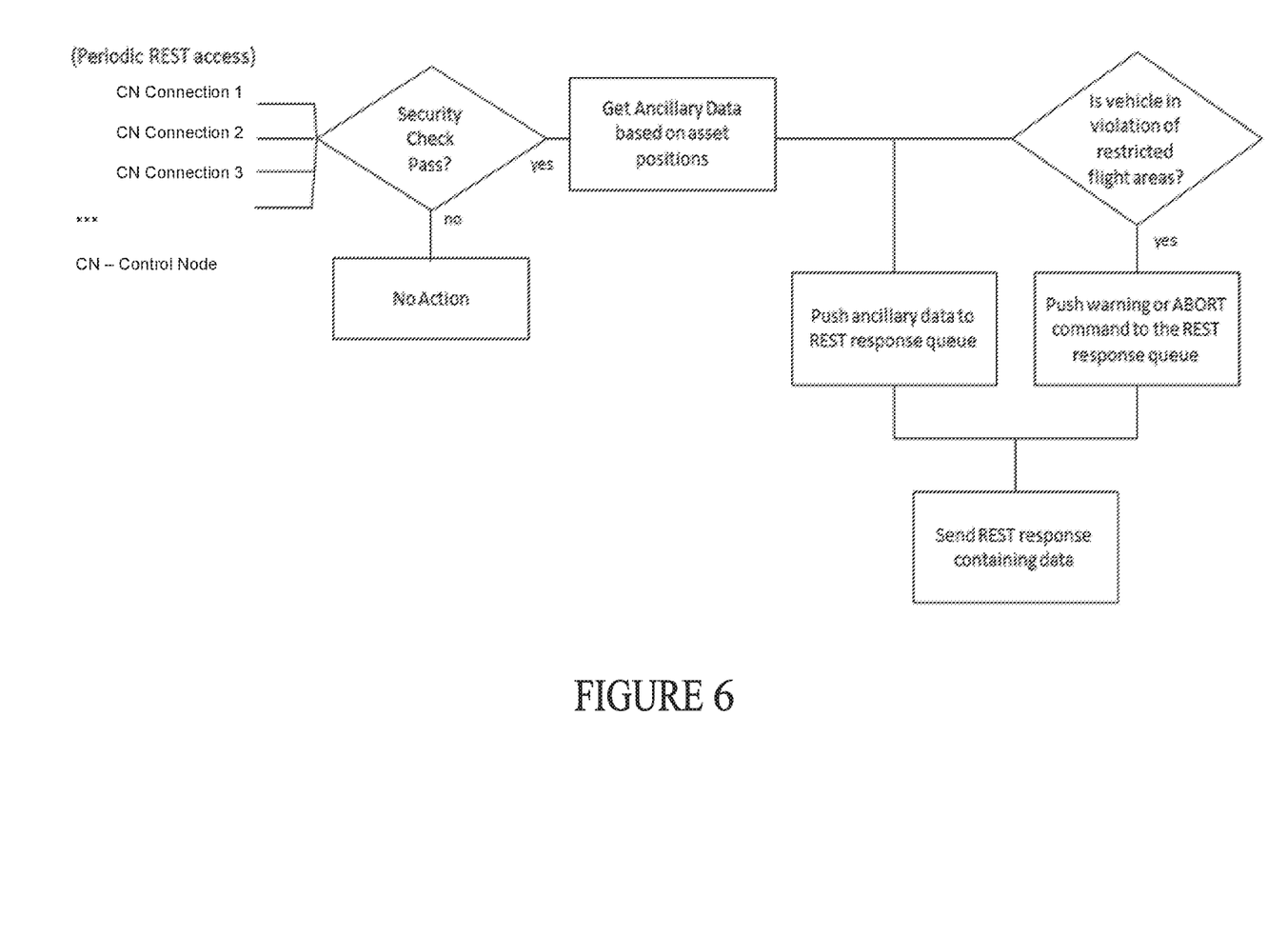
FIG. 6 is an exemplary ancillary data and safety override flow.

FIG. 6 enables users to push ancillary data based on the asset's location. As shown, a cluster 120 may receive ancillary information directly from a publisher in proximity to the UV 102. The information may be needed at both the UV 102 and the control node. For example, such information might contain warnings that there is insufficient battery power remaining for the UV 102 to return to a home location due to weather conditions. An alternate alert may be a notification that a manned aircraft is in proximity of the UV 102 or the UV 102 is within a restricted flight area. As such, instead of pushing the information through a public network, the UV 102 may push the data directly to one or more control nodes. This may occur through a push command that results in a warning or a command to abort a travel plan or a maneuver to ensure compliance with safety and/or legal restrictions.

Each of the systems and processes described may be encoded in a signal-bearing medium, a computer readable medium, such as a memory, programmed within a device such as one or more integrated circuits, or processed by a controller or a computer. If the processes are encoded in software, the software may reside in a memory interfaced to or resident to other type of non-volatile or volatile memory, resident or interfaced to a communication, control, or an Internet-based device. The memory may include an ordered listing of executable instructions for implementing logical functions. Logic or logical functions may be implemented through digital circuitry (e.g., monotonic circuit), through source code, through analog circuitry, or through an analog source such as through an analog electrical or optical signal. The software may be embodied in any computer-readable or signal-bearing medium, for use by, or in connection with an instruction executable system, apparatus, or device. Such a system may include a computer-based system, a processor-containing system, or another system that may selectively fetch instructions from an instruction executable system, a non-transitory apparatus, or device that may also execute instructions.

A "computer-readable medium," "machine-readable medium," and/or "signal-bearing medium" may comprise any apparatus that stores, communicates, or transports data and/or software for use by or in connection with an instruction executable system, apparatus, or device. The machine-readable medium may selectively be, but not limited to, an electronic, magnetic, optical, electromagnetic, infrared, or semiconductor system, apparatus, devices. A non-exhaustive list of examples of a machine-readable medium would include: an electrical connection having one or more tangible connections, a portable magnetic or optical disk, a volatile memory such as a Random Access Memory "RAM" (electronic), a Read-Only Memory "ROM" (electronic), or an Erasable Programmable Read-Only Memory (EPROM or Flash memory).

All or parts including the controllers may comprise one or more controllers, one or more microprocessors (CPUs), one or more signal processors (SPU), one or more graphics processors (GPUs), one or more application specific integrated circuit (ASIC), etc. All or part of the logic, specialized processes, and systems may be implemented as instructions for execution by multi-core processors (e.g., CPUs, SPUs, and/or GPUs), controller, or other processing devices and stored in a tangible or non-transitory machine-readable or computer-readable medium such as flash memory, random access memory (RAM) or read only memory (ROM), erasable programmable read only memory (EPROM) or other machine-readable medium such as a compact disc read only memory (CDROM), or magnetic or optical disk. Thus, a product, such as a computer program product, may include a storage medium and computer readable instructions stored on the medium, which when executed in an endpoint, computer system, or other device, cause the device to perform operations according to any of the process descriptions or hardware descriptions above.

The term "coupled" disclosed in this description may encompass both direct and indirect coupling. Thus, first and second parts are said to be coupled together when they directly contact one another, as well as when the first part couples to an intermediate part which couples either directly or via one or more additional intermediate parts to the second part. The term "substantially" or "about" encompasses a range that is largely (ninety five percent or more), but not necessarily wholly, that which is specified. It encompasses all but an insignificant amount. The term "near" means within a short distance or interval in space or time. A cluster is a group of independent network servers that operate—and appear to the UV clients—as if they were a single server. Clustering improves network capacity by, among other things, enabling the servers themselves within a cluster to shift work in order to balance the processing load. By enabling one or more servers to take over for another in a cluster, clustering enhances network stability and minimizes or eliminates downtime caused by application or system failure.

When devices are responsive to or occur in response to commands, events, and/or requests, the actions and/or steps of the devices, such as the operations that devices are performing, necessarily occur as a direct or indirect result of the preceding commands, events, actions, and/or requests. In other words, the operations occur as a result of the preceding operations. A device that is responsive to another requires more than an action (i.e., the device's response) to merely follow another action.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

What is claimed is:

1. A multimodal communication system comprising:
a vehicle controller that controls one or more of electrical systems or subsystems of an unmanned vehicle;
a communication controller in communication with the vehicle controller that manages communication and logical access to the unmanned vehicle;
a sensor in communication with the communication controller that detects and measures a physical property in proximity to the unmanned vehicle by converting non-electrical energy into data;
a plurality of transceivers in communication with the communication controller, the plurality of transceivers are programmed to receive and process unmanned vehicle commands transmitted simultaneously and are configured to communicate through point-to-point radios and point-to-multipoint radios; and
a monotonic generator that generates a monotonic object each time a state change occurs in the unmanned vehicle; and
where the communication controller executes a first unmanned vehicle command received from the plurality of transceivers that has a verified cryptographic hash object assigned to a current operating state of the unmanned vehicle.

2. The multimodal communication system of claim 1 further comprising monotonic logic that atomically generates or modifies the monotonic object when the unmanned vehicle changes operating state.

3. The multimodal communication system of claim 2 where the monotonic logic suspends the generation or modification of the monotonic object until the unmanned vehicle changes operating state.

4. The multimodal communication system of claim 3 where the monotonic logic authenticates monotonic objects by comparing persistent monotonic objects assigned to the unmanned vehicle's current operating state to those received in a new unmanned vehicle state.

5. The multimodal communication system of claim 1 where the communication controller discards an unmanned vehicle commands received after the first unmanned vehicle command that does not match cryptographic hashes, the cryptographic hashes comprise mutations of a representation of a current operating state of the unmanned vehicle and an applied unmanned vehicle command.

6. The multimodal communication system of claim 1 further comprising a memory coupled to and local to the communication controller and a goal state engine stored in the memory that comprises a plurality of operations to be executed to attain a desired outcome.

7. The multimodal communication system of claim 1 where the first unmanned vehicle command comprises an encoded mutation of data representing the current operating state of the unmanned vehicle and a new expected state of the unmanned vehicle.

8. The multimodal communication system of claim 1 where the communication controller is authenticated with security tokens physically that are a unitary part of a hardware of the unmanned vehicle.

9. The multimodal communication system of claim 1 where the unmanned vehicle is programmed to authenticate itself and register itself before messages are routed to control nodes.

10. The multimodal communication system of claim 1 where the unmanned vehicle communicates in a distributed manner according to an architecture that uses publish and subscribe semantics to exchange state.

11. The multimodal communication system of claim 1 where an architecture includes a processor configured to participate in a publish and subscribe behaviour to distribute system state and commands.

12. The multimodal communication system of claim 11 where the processor is configured to participate in the publish and subscribe behaviour by establishing a subscriber responsive to an operating command changing state.

13. The multimodal communication system of claim 12 where the processor is configured to participate in the publish and subscribe behaviour by removing a publisher of system state.

14. A multimodal communication system comprising:
a central processing unit processing executable code accessed from random access memory, in which the executable code functions as:
a vehicle controller that controls one or more of electrical systems or subsystems of an unmanned vehicle;
a communication controller in communication with the vehicle controller that manages communication and logical access to the unmanned vehicle;
a sensor in communication with the communication controller that detects and measures a physical property in proximity to the unmanned vehicle by converting nonelectrical energy into electrical energy;
a plurality of transceivers in communication with the communication controller which is programmed to receive unmanned vehicle commands simultaneously; and
a monotonic generator that generates a monotonic object each time a state change occurs in the unmanned vehicle;
where the communication controller executes a first unmanned vehicle command received from the plurality of transceivers when the first unmanned vehicle command matches an expected cryptographic hash that comprises a mutation of the current operating state of the unmanned vehicle and an applied unmanned vehicle command that controls the unmanned vehicle.

15. The multimodal communication system of claim 14 further comprising monotonic logic that atomically generates or modifies the monotonic object when the unmanned vehicle changes operating state.

16. The multimodal communication system of claim 15 where the monotonic logic suspends the generation or modification of the monotonic object until the unmanned vehicle changes operating state.

17. The multimodal communication system of claim 16 where the monotonic logic authenticates monotonic objects by comparing persistent monotonic objects assigned to an operating state of the unmanned vehicle to those received in a new unmanned vehicle state message.

18. The multimodal communication system of claim 14 where the communication controller discards an unmanned vehicle commands received after the first unmanned vehicle command that do not match cryptographic hashes which are mutations of the current operating state of the unmanned vehicle and the applied command.

19. The multimodal communication system of claim 14 further comprising a memory coupled to and local to the communication controller and a goal state engine stored in the memory that comprise a plurality of possible vehicle operations to be executed to attain a desired end state.

20. A multimodal communication system comprising:
a vehicle controller that controls one or more of electrical systems or subsystems of an unmanned vehicle;
a communication controller in communication with the vehicle controller that manages communication and logical access to the unmanned vehicle;
a sensor in communication with the communication controller that detects and measures a physical property in proximity to the unmanned vehicle by converting non-electrical energy into data;
a plurality of transceivers in communication with the communication controller, the plurality of transceiver are programmed to receive and process unmanned vehicle commands transmitted simultaneously and are configured to communicate to point-to-point nodes and point-to-multipoint nodes; and
a monotonic circuit in communication with the communication controller configured to generate a monotonic object in response to a state change that occurs in the unmanned vehicle; and
where the communication controller executes a first unmanned vehicle command received from the plurality of transceivers that has a cryptographic hash assigned to a current operating state of the unmanned vehicle.

* * * * *